United States Patent Office 3,474,150
Patented Oct. 21, 1969

3,474,150
METHOD FOR THE PRODUCTION OF 5-γ-HYDROXY - PROPYLIDENE - SUBSTITUTED DIBENZOCYCLOHEPTENES
Norman L. Wendler, Summit, N.J., assignor to Merk & Co., Inc., Rahway, N.J., a corporation of New Jersey
No Drawing. Continuation of application Ser. No. 351,856, Mar. 13, 1964, which is a continuation-in-part of application Ser. No. 202,977, June 18, 1962. This application Oct. 31, 1966, Ser. No. 591,028
Int. Cl. C07c 35/20, 29/00, 15/00
U.S. Cl. 260—618          6 Claims

ABSTRACT OF THE DISCLOSURE

The invention relates to dibenzocycloheptenes, useful as intermediates in the preparation of other dibenzo cycloheptenes which have utility in the treatment of mental health conditions.

This application is a continuation of my copending application Serial No. 351,856 filed Mar. 13, 1964, now abandoned, which is a continuation-in-part of my co-pending application Serial No. 202,977, filed June 18, 1962, now abandoned.

This invention relates to the preparation of derivatives of dibenzocycloheptenes. In particular, the invention relates to the preparation of dibenzocycloheptenes which are substituted at the 5-position with a γ-hydroxypropylidene radical. The invention also relates to intermediates which are useful in the synthesis of the above-mentioned compounds.

The process provided by the present invention comprises reacting a dibenzocyclohepten-5-one with an allyl magnesium halide, hydrolyzing the resulting Grignard adduct to form the corresponding 5-allyl-5-hydroxy derivative, then dehydrating the latter to form the corresponding 5-allylidene derivative and then subjecting the allylidene derivative to hydroboration followed by oxidative hydrolysis to form the corresponding 5-(γ-hydroxypropylidene) derivative.

While the process is particularly suitable for the preparation of 5-(γ-hydroxypropylidene)-5H-dibenzo-[a,d] cycloheptene and 10,11-dihydro-5-(γ-hydroxypropylidene)5H-dibenzo[a,d]cycloheptene from the appropriate dibenzocycloheptenone, it may be used with equal facility for the preparation of those 5-(γ-hydroxypropylidene)-5H - dibenzo[a,d]cycloheptenes and 10,11-dihydro-5-(γ-hydroxypropylidene) - 5H - dibenzo[a,d]cycloheptenes which may be substituted in the benzene moieties with one or more substituents from the appropriately substituted ketones providing such substituents will not react with the reagents utilized in the process. Thus, for example, the process may be used to prepare 5-(γ-hydroxypropylidene)-5H-dibenzo[a,d]-cycloheptenes and 10,11-dihydro-5-(γ-hydroxypropylidene) - 5H - dibenzo[a,d]cycloheptenes which are substituted in the benzene moieties with one or more groups such as lower alkyl, lower alkoxy, halogen, mercapto, loweralkylmercapto, loweralkylsulfonyl, diloweralkylsulfamyl and phenyl. In addition, the process of the present invention also may be utilized to prepare those 5-(γ - hydroxypropylidene)-5H-dibenzo[a,d]cycloheptenes and 10,11-dihydro-5-(γ-hydroxypropylidene)-5H-dibenzo[a,d]cycloheptenes which are also substituted at either the 10 or 11 positions with a halogen atom. The substitution at the 10 or 11 positions can be in addition to or in lieu of other nuclear substituents.

Representative compounds which may be prepared in accordance with this invention include:

10-chloro-5-(γ-hydroxypropylidene)-5H-dibenzo[a,d]-cycloheptene
10,11-dihydro-5-(γ-hydroxypropylidene)-3-mercapto-5H-dibenzo[a,d]cycloheptene
5-(γ-hydroxypropylidene)-3-methylsulfonyl-5H-dibenzo[a,d]-cycloheptene
3-10-dichloro-5-(γ-hydroxypropylidene)-5H-dibenzo[a,d]-cycloheptene
10,11-dihydro-5-(γ-hydroxypropylidene)-3-methylmercapto-5H-dibenzo[a,d]cycloheptene
5-(γ-hydroxypropylidene)-3-methyl-5H-dibenzo[a,d] cycloheptene
5-(γ-hydroxypropylidene)-3-methoxy-5H-dibenzo[a,d]cycloheptene For purposes of illustration, the preparation of the compounds 5 - (γ-hydroxypropylidene)-5H-dibenzo[a,d]-cycloheptenes and 10,11-dihydro-5-(γ-hydroxypropylidene)-5H-dibenzo[a,d]cycloheptenes from the appropriate dibenzocyclohepten-5-one may be represented structurally as follows:

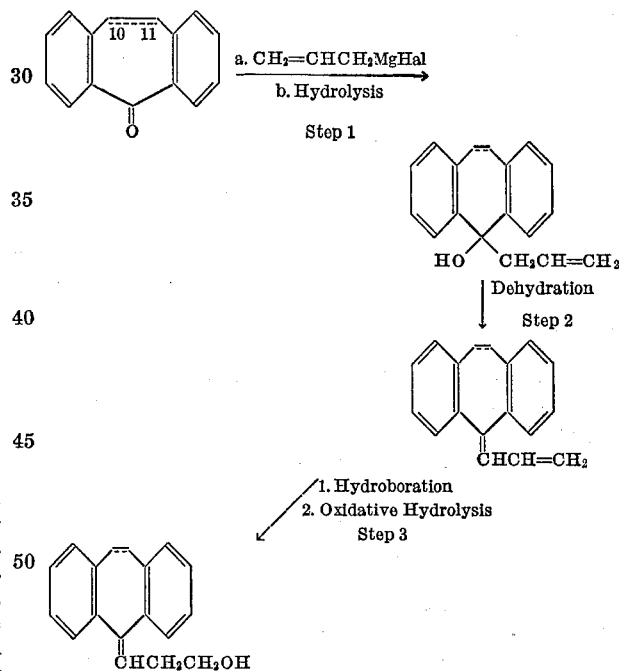

In the above reaction sequence, Hal represents halogen, preferably chlorine or bromine, and the dotted line indicates that the compounds may be saturated or unsaturated at the 10,11-positions.

However, as previously indicated hereinabove, the above illustrated process may also be utilized for the preparation of those dibenzocycloheptenes containing one or more nuclear substituents by employing an appropriately substituted dibenzocyclohepten-5-one in place of the unsubstituted ketone.

As illustrated by the reaction scheme above, the first step of the process involves the reaction of a dibenzocyclohepten-5-one with a Grignard reagent, namely, an allylmagnesium halide and thereafter hydrolyzing the resulting adduct to form the corresponding 5-allyl-5-hydroxy-derivative. The starting compounds utilized in this step of the process may be prepared as described in the examples or they may be prepared using the processes described in J.A.C.S. 73, 1673–1678 (1951), Helv. Chem. Acta 36, 1489–1499 (1953), J. Org. Chem. 27, 230–240 (1962), British Patent No. 858,186 and elsewhere in the literature.

The Grignard reagent may be prepared by known procedures. Similarly, the reaction of the Grignard reagent with the starting ketone and the hydrolysis of the resulting Grignard adduct may be effected employing conventional procedures and conditions. A suitable procedure is described in U.S. Patent No. 3,014,911.

The dehydration of the carbinol (Step 2) to the corresponding 5-allylidene derivative may also be carried out employing conventional procedures such as described in the above-mentioned U.S. patent.

The third step of the process involves the conversion of 5-allylidene derivative to the corresponding 5-($\gamma$-hydroxypropylidene) derivative. This is accomplished by hydroborating the 5-allylidene derivative with a borane containing at least one B-H bond to form the intermediate borane derivative and thereafter subjecting the latter to oxidative hydrolysis. Suitable boranes for carrying out the hydroboration include diborane, and alkyl boranes such as bis-3-methyl-2-butylborane.

The reaction temperature is not critical, but it is preferred to carry out the hydroboration at low temperatures, preferably 0–5° C., and in the presence of an inert, organic solvent. Where an unsubstituted borane is employed it is preferred to limit the amount employed to that required stoichiometrically in order to achieve selective hydroboration of the desired double bond. However, in those instances where substituted boranes are employed, it is not necessary to limit the amount employed, although it is still preferred to employ a stoichiometric amount. The oxidative hydrolysis is carried out in the presence of a hydroperoxide, preferably hydrogen peroxide, and under basic conditions such as by the use of aqueous sodium hydroxide. The desired end product may be conveniently isolated using conventional procedures.

The end compounds of the present invention, i.e., 5-($\gamma$-hydroxypropylidene)-dibenzocycloheptenes, are useful as intermediates in the preparation of other dibenzocycloheptenes which are useful in the treatment of mental health conditions, as described in copending application Ser. No. 188,873, filed Apr. 19, 1962, now Patent No. 3,272,864.

The following examples are given for purposes of illustrating the present invention and are not to be construed as limiting the invention.

EXAMPLE 1

5-hydroxy-5-allyl-5H-dibenzo[a,d]-10,11-dihydrocycloheptene

To a 125 ml., 3-neck flask (flamed out and cooled under dry nitrogen) equipped with a stirrer, addition funnel and ether-type condenser, are charged 4.8 g. of clean magnesium turnings and 15 ml. of dry ethyl ether. 17 g. of allyl bromide in 10 ml. of dry ether is added dropwise with stirring at a rate sufficient to maintain a gentle reflux. Stirring and refluxing are continued until all the metal is gone. The reaction mixture is then cooled below the point of reflux, but not so low as to cause the Grignard reagent to precipitate, and 10 g. of 5H-dibenzo[a,d]-10,11-dihydrocyclohepten-5-one in 20 ml. of dry ether is added with stirring in 15 minutes. The reaction mixture is stirred and allowed to react at room temperature for ½ hour. The reaction mixture then is chilled in an ice-bath and treated with 45 ml. of saturated ammonium chloride solution. The layers are separated and just enough water is added to dissolve the solid salts in the aqueous layer. The latter is extracted with 2×25 ml. of ether. The combined organic layers are washed with 25 ml. of saturated salt solution, dried over magnesium sulfate and the solvent removed in vacuo to yield the hydroxy intermediate:

$$\lambda_{max.}^{CH_3OH} \ 240\mu \ E\% \ 495$$

EXAMPLE 2

5-hydroxy-5-allyl-5H-dibenzo[a,d]cycloheptene

Following the procedure described in detail in Example 1 and using equivalent quantities of 5H-dibenzo[a,d]cyclohepten-5-one, there is produced the corresponding 5-hydroxy-5-allyl-5H-dibenzo[a,d]cycloheptene.

EXAMPLE 3

5-allylidene-5H-dibenzo[a,d]-10,11-dihydrocycloheptene

5 - hydroxy - 5 - allyl - 5H - dibenzo[a,d] - 10,11 - dihydrocycloheptene is distilled in high vacuum at 1 mm. to provide the diene as a viscous liquid:

$$\lambda_{max.}^{CH_3OH} \ 240\mu \ E\% \ 495$$

EXAMPLE 4

5-allylidene-5H-dibenzo[a,d]cycloheptene

Following the procedure described in Example 3 and using the intermediate produced in Example 2, there is produced 5-allylidene-5H-dibenzo[a,d]cycloheptene.

EXAMPLE 5

5-($\gamma$ - hydroxypropylidene) - 5H - dibenzo[a,d] - 10,11-dihydrocycloheptene A solution of 0.5 g. of the diene produced in Example 3 in 15 cc. of tetrahydrofuran is treated with 1 mole equivalent of bis-3-methyl-2-butylborane at 0–5° C. for a period of 3 hours. At the conclusion of this period, 3 cc. of water is added, followed by 8 cc. of 2.5 n sodium hydroxide and the dropwise addition of 6–7 cc. of 30% hydrogen peroxide. The aqueous phase in then salted with potassium carbonate and the tetrahydrofuran layer is separated, dried over magnesium sulfate, and the solvent is removed in vacuo. The residue is crystallized from ether to give the desired $\gamma$-hydroxy compound, M.P. 88–89° C.

EXAMPLE 6

5-($\gamma$-hydroxypropylidene)5-H-dibenzo[a,d]cycloheptene

Following the procedure described in detail in Example 5 and using equivalent quantities of the compound produced in Example 4, there is produced the corresponding 5-($\gamma$-hydroxypropylidene)-5H-dibenzo[a,d]-cycloheptene.

EXAMPLE 7

10,11 - dihydro - 3 - dimethylsulfamyl - 5H - dibenzo[a,d]cyclohepten-5-one

Step A: 7-bromo - 3 - fluorosulfonyl-10,11-dihydro-5H-dibenzo[a,d]cyclohepten-5-one.—Fluorosulfonic acid, 100 ml., is placed in a 300 ml. 3-neck round bottom flask equipped with polyethylene inlet tube and polyethylene exit tube with drying tube half-filled with anhydrous sodium fluoride. A nitrogen atmosphere is maintained throughout the reaction. With stirring, 17.0 g. (0.059 mole) of 3-bromo-10,11 dihydro-5H-dibenzo[a,d]cyclohepten-5-one is added in portions over 20 mintues. After stirring another 10 minutes, the dark green solution is heated on the steam-bath for 6½ hours. The mixture then is cooled to room temperature, poured cautiously with stirring into 1.5 kg. of crushed ice, and allowed to stand overnight at room temperature. The brown solid is collected, washed with water, dried in a vacuum desiccator over sodium hydroxide, and then extracted in a Sohxlet extractor with 700 ml. of boiling cyclohexane for 16 hours. On cooling, the cyclohexane extract deposits 11.65 g. (53%) of 7-bromo-3-fluorosulfonyl-10,11-dihydro-5H-dibenzo[a,d]cyclohepten-5-one as dark yellow flakes, M.P.

148–151° C. Recrystallizations from ether and cyclohexane give an analytical sample, M.P. 150–152° C.

*Analysis.*—Calcd. for $C_{15}H_{10}O_3FBrS$: C, 48.79; H, 2.73; S, 8.69. Found: C, 48.78; H, 2.83; S, 8.87.

Step B: 7-bromo-10,11-dihydro-3-dimethylsulfamyl-5H-dibenzo[a,d]cyclohepten - 5 - one.—7 - bromo - 10,11 - dihydro - 3 - fluorosulfonyl - 5H - diberzo[a,d]cyclohepten-5-one (2.5 g., 0.00677 mole), together with 30 ml. of 25% aqueous dimethylamino and 30 ml. of p-dioxane is heated to refluxing for 3 hours. The brown solution is evaporated to dryness under reduced pressure and the residue partitioned between benzene and water. After washing with water, the benzene layer is evaporated to dryness under reduced pressure, leaving 7-bromo-10,11-dihydro-3-dimethylsulfamyl-5H-dibenzo[a,d]cyclohepten-5-one as a tan solid, M.P. 142–145° C., in a yield of 2.1 g. (80%). An analytical sample melts at 146–148° C. after crystallizations from mixture of benzene and hexane and from methanol.

*Analysis.*—Calcd. for $C_{17}H_{16}O_3NBrS$: C, 51.78; H, 4.09; N, 3.55. Found: C, 51.71; H, 4.12; N, 3.53.

Step C: 10,11-dihydro-3-dimethylsulfamyl-5H-dibenzo[a,d]cyclohepten - 5 - one.—7 - bromo - 10,11 - dihydro - 3 - dimethylsulfamyl - 5H-dibenzo[a,d]cyclohepten-5-one, 8.0 g. (0.0203 mole), is dissolved in a mixture of 100 ml. of absolute ethanol, 70 ml. of dimethylformamide and 5 ml. of triethylamine. The solution is hydrogenated at atmospheric pressure and in the presence of 600 mg. of 10% palladium on charcoal catalyst until hydrogen uptake is complete. Catalyst is removed by filtration and washed with absolute ethanol. The filtrate is evaporated to dryness under reduced pressure and the residue triturated with benzene. The insoluble triethylamine hydrobromide is filtered and the benzene filtrate evaporated to dryness under reduced pressure. Crystallization of the residual white solid from absolute ethanol affords 6.1 g. (97%) of 10,11-dihydro-3-dimethylsulfamyl-5H-dibenzo[a,d]cyclohepten-5-one, M.P. 122–124° C. The melting point is unchanged after crystallization from absolute ethanol.

*Analysis.*—Calcd. for $C_{17}H_{17}O_3NS$: C, 64.74; H, 5.44; N. 4.44. Found: C, 64.20; H, 5.47; N, 4.16.

EXAMPLE 8

10,11 - dihydro - 3 - methylmercapto - 5H - dibenzo[a,d]cyclohepten-5-one

Step A: Ppreparation of cuprous methylmercaptide.—Concentrated ammonium hydroxide solution, 300 ml., is placed in a 1 liter 3-neck flask fitted with a stirrer and gas inlet tube. The apparatus is cooled in an ice-bath and flushed with dry nitrogen while 40.0 g. (0.40 mole) of cuprous chloride is added portionwise with stirring. To the dark blue solution is added 95% ethanol, 300 ml., and then methylmercaptan is bubbled into the cooled solution until precipitation is complete and the supernatant solution becomes yellow. The solid is collected and washed by centrifugation with four portions of dilute ammonium hydroxide solution, followed by four portions of absolute ethanol. The yellow product is dried under reduced pressure at 45–50° C. and finally in a vacuum desiccator over concentrated sulfuric acid. The yield of product is 41.4 g. (93%).

Step B: Preparation of 10,11-dihydro-3-methylmercapto - 5H - dibenzo[a,d]cyclohepten - 5 - one.—3-bromo-10,11-dihydro - 5H - dibenzo[a,d]cyclohepten-5-one, 0.14 mole, and cuprous methylmercaptide, 0.18 mole, prepared as described in Step A, are put in a 100 ml. flask fitted with a stirrer and reflux condenser. Quinoline, 225 ml., and pyridine, 20 ml., are added and the slurry is heated at about 200° C. with stirring for 8 hours. The reaction mixture is poured into 6 N hydrochloric acid, 500 ml., and ice, and extracted with four 300 ml. portions of boiling benzene. The combined extracts are washed with three 500 ml. portions of 3 N hydrochloric acid. After washing with water, the solvent is evaporated under reduced pressure leaving a brown oil as residue. The residue is distilled under reduced pressure (0.01 mm.). The distillate solidifies and is recrystallized from 95% ethyl alcohol.

Step C: Preparation of 10,11-dihydro-3-methyl-sulfonyl-5H - dibenzo[a,d]cyclohepten - 5 - one.—10,11 - dihydro-3-methylmercapto-5H - dibenzo[a,d]cyclohepten - 5 - one, 0.042 mole, is dissolved in 35 ml. of glacial acetic acid. Hydrogen peroxide (30%, 15 ml.) is added and the solution is stirred at room temperature for 65 hours. The desired product precipitates and is collected and dried. The product may be further purified by recrystallization.

I claim:
1. A compound selected from the group consisting of 5 - allylidene - 5H - dibenzo[a,d]cycloheptene and 5-allylidene-10,11-dihydro-5H-dibenzo[a,d]cycloheptene.
2. A compound selected from the group consisting of 5-allyl-5-hydroxy - 5H - dibenzo[a,d]cycloheptene and 5-allyl-10,11-dihydro-5-hydroxy-5H - dibenzo[a,d]cycloheptene.
3. 5-allylidene-5H-dibenzo[a,d]cycloheptene.
4. 5-allylidene-10,11-dihydro-5H-dibenzo[a,d]cycloheptene.
5. 5-allyl-5-hydroxy-5H-dibenzo[a,d]cycloheptene.
6. 5-allyl-10,11-dihydro-5 - hydroxy - 5H - dibenzo[a,d]cycloheptene.

References Cited

UNITED STATES PATENTS

| | | |
|---|---|---|
| 3,134,820 | 5/1964 | Davis et al. |
| 3,215,739 | 11/1965 | Holm. |
| 3,189,657 | 6/1965 | Mills _____ 260—649 |
| 3,116,291 | 12/1963 | Petersen et al. _____ 260—240 |
| 3,167,541 | 1/1965 | Von der Stelt _____ 260—239 |
| 3,189,657 | 6/1965 | Mills et al. _____ 260—649 |
| 3,134,820 | 5/1964 | Davis et al. _____ 260—618 |
| 3,215,739 | 11/1965 | Holm et al. _____ 260—570.8 |
| 3,256,332 | 6/1966 | Lassen. |

OTHER REFERENCES

Brown et al., "J. Am. Chem. Soc.," vol. 82, p. 3223 and pp. 4708–12 (1960).

Cope et al., "J. Am. Chem. Soc.," vol. 73, pp. 1673–78 (1951).

Cristal et al., "J. Am. Chem. Soc.," vol. 82. pp. 6155–62 (1960).

Morrison et al., "Organic Chemistry," p. 115 (1959).

Brown et al., Hydroboration, J. Am. Chem. Soc. 82, p. 4708–12, 3223 (1960).

Zweifel et al., Hydroboration, J. Am. Chem. Soc. 84 p. 190–3 (1962).

Cope et al., J. Am. Chem. Soc. 73, p. 1673–78 (1951).

Treibs et at., "Berichte," vol. 83, pp. 367–71 (1950).

Treibs et al., "Berichte," vol. 84, pp. 671–79 (1951).

Winthrop et al., "J. Organic Chemistry," vol. 27, pp. 230–40 (1962).

LEON ZITVER, Primary Examiner

M. W. GLYNN, Assistant Examiner

U.S. Cl. X.R.

260—688